(12) United States Patent
Bussiere et al.

(10) Patent No.: US 7,246,810 B2
(45) Date of Patent: Jul. 24, 2007

(54) HITCH LOCKING MODULE

(76) Inventors: Daniel Bussiere, 3800 Avenue Tour du Lac, Herouxville (CA) G0X 1J0; Pierre-Andre Vallee, 201, 64ieme rue, Lac a la Tortue (CA) G0X 1L0

( * ) Notice: Subject to any disclaimer, the term of this patent is extended or adjusted under 35 U.S.C. 154(b) by 168 days.

(21) Appl. No.: 11/199,510

(22) Filed: Aug. 9, 2005

(65) Prior Publication Data

US 2006/0181060 A1    Aug. 17, 2006

(51) Int. Cl.
*B60D 1/60* (2006.01)
(52) U.S. Cl. ..................................... 280/507
(58) Field of Classification Search ................ 280/507, 280/432, 511
See application file for complete search history.

(56) References Cited

U.S. PATENT DOCUMENTS

| | | | | |
|---|---|---|---|---|
| 5,681,053 A * | 10/1997 | Misukanis et al. | .......... | 280/507 |
| 6,244,614 B1 * | 6/2001 | Bonvillain et al. | ......... | 280/507 |
| 6,588,239 B1 * | 7/2003 | Johansson | ...................... | 70/14 |
| 6,758,486 B1 * | 7/2004 | Kollath | ........................ | 280/515 |
| 6,932,376 B1 * | 8/2005 | Profitt | ........................ | 280/507 |
| 7,066,483 B2 * | 6/2006 | Makos et al. | ............... | 280/507 |
| 7,090,238 B1 * | 8/2006 | Moore | ......................... | 280/507 |
| 7,174,751 B2 * | 2/2007 | Escalante, III | ................. | 70/14 |

* cited by examiner

*Primary Examiner*—Tony Winner

(57) ABSTRACT

A hitch locking module constituted of a box like device having a hingedly attached cover which locks shut over the ball attachment of a tow bar, thus making it impossible to unhitch the tow bar unless one has a key to open the cover of the hitch locking module.

1 Claim, 9 Drawing Sheets

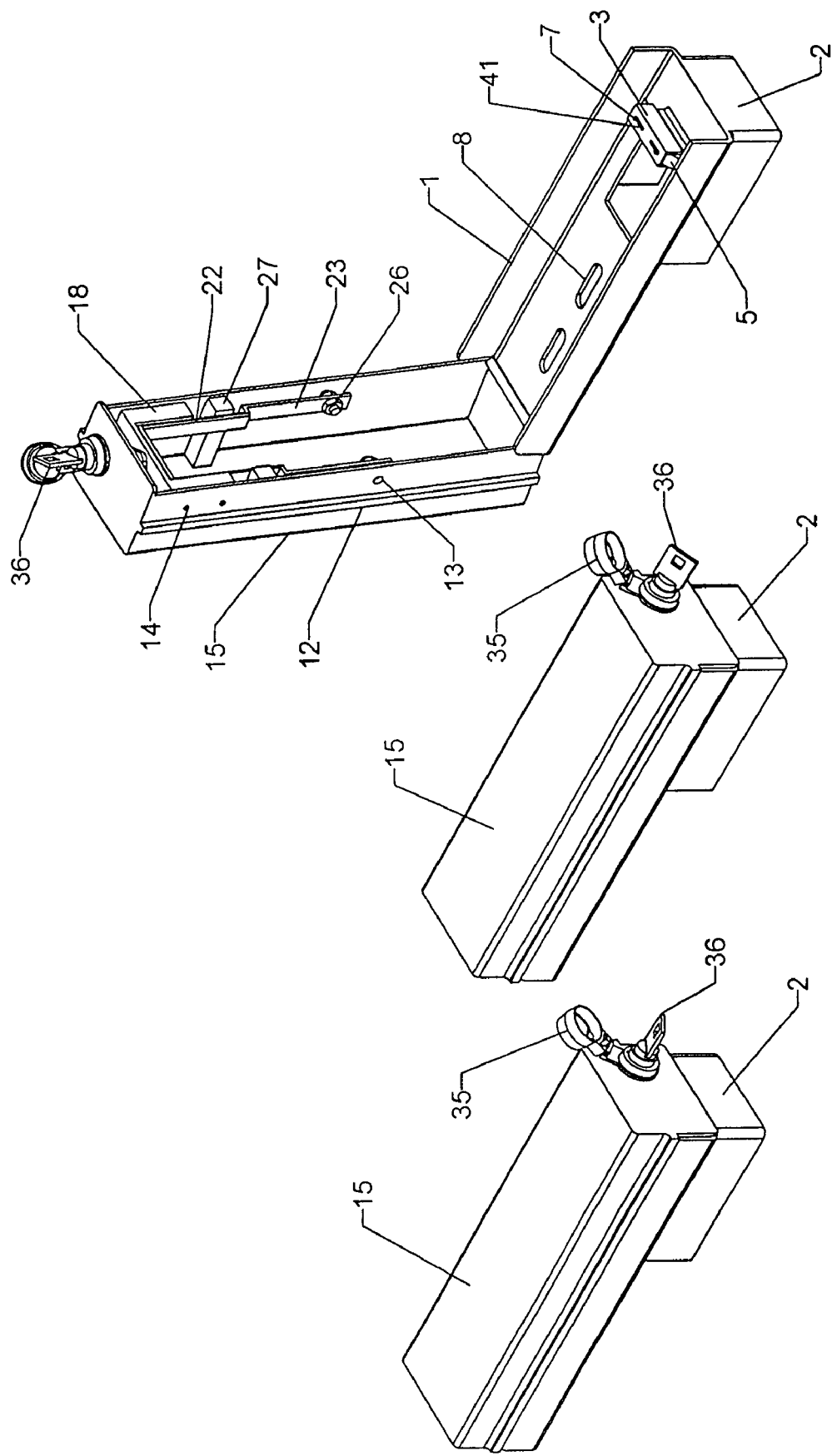

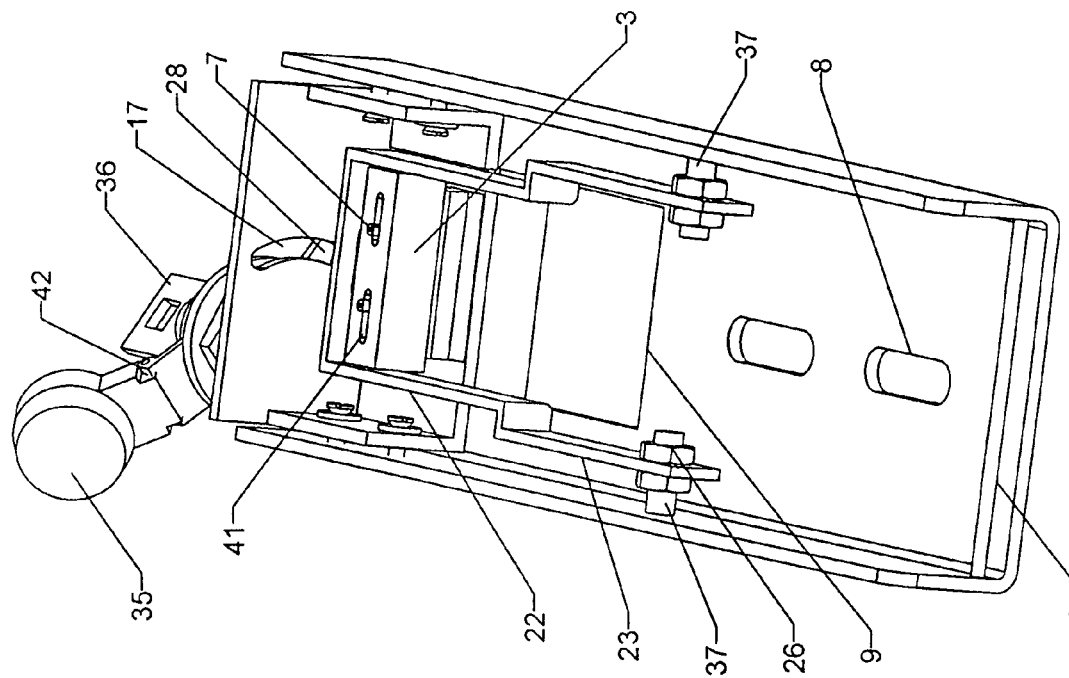
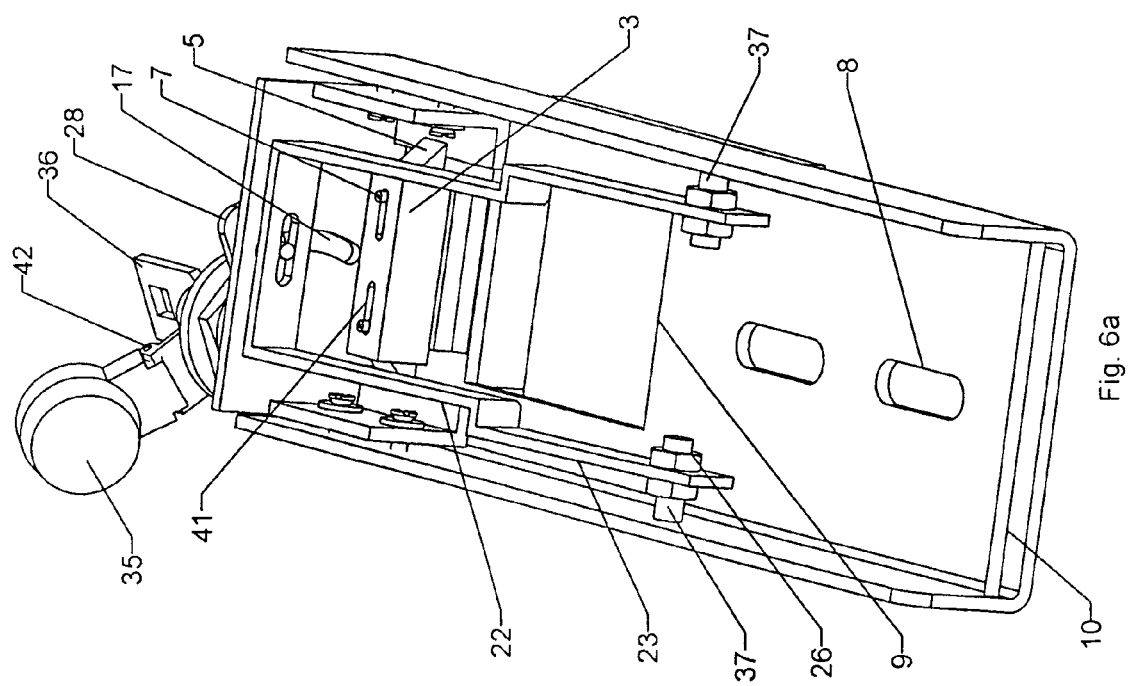

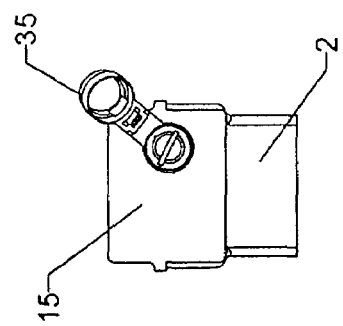
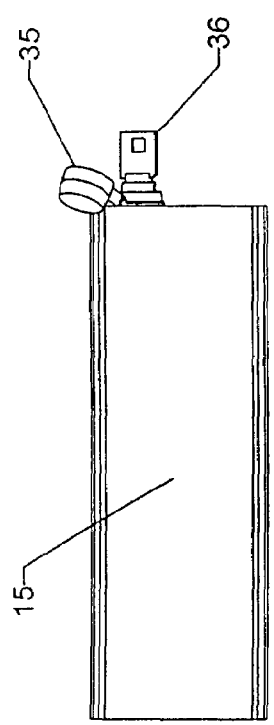
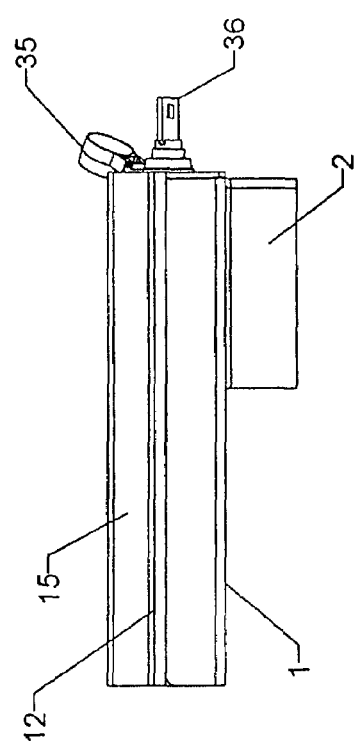
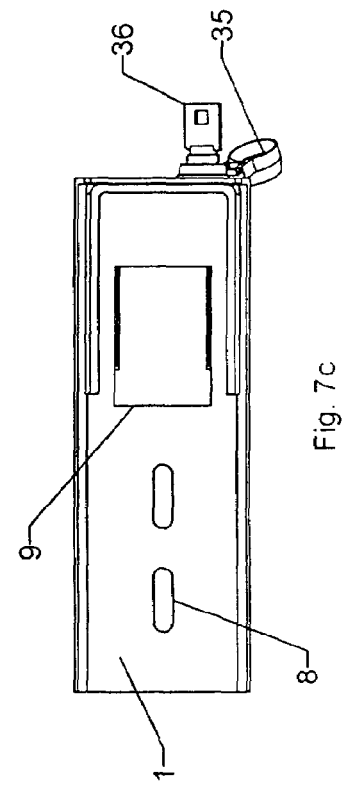
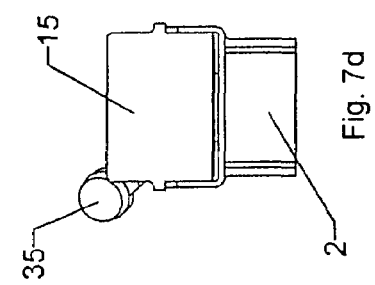

HITCH LOCKING MODULE

BACKGROUND OF THE INVENTION

1. Field of the Invention

The invention relates generally to hitches and towing but more particularly to a cover to lock a tow bar onto a hitch ball.

2. Description of Related Art

A search of prior art records has unveiled the following patents:
1. CA 2,168,296 registered in 1996 to Kazmark;
2. CA 2,000,699 issued in 1995 to Losego;
3. CA 1,309,118 issued in 1988 to Young;
4. CA 1,145,793 issued in 1983 to Lovell;
5. CA 2,252,951 registered in 1998 to Austin;
6. U.S. Pat. No. 4,852,902 issued in 1989 to Young;
7. U.S. Pat. No. 6,173,984 issued in 2001 to Kay;
8. U.S. Pat. No. 6,095,546 issued in 2000 to Austin;
9. U.S. Pat. No. 4,852,902 issued in 1989 to Young; and
10. U.S. Pat. No. 4,571,964 issued in 1986 to Bratzler.

Protecting from theft a hitched trailer has been a concern of many inventors over the years and several devices designed for that purpose has been invented.

SUMMARY OF THE INVENTION

In order to do so, the hitch locking module consists of a box like device having a hingedly attached cover which locks shut over the ball attachment of a tow bar, thus making it impossible to unhitch the tow bar unless one has a key to open the cover of the hitch locking module.

The foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE PREFERRED EMBODIMENT

FIG. 1 illustrates a perspective view of the hitch locking module open and disassembled from a hitch ball receptacle mechanically fastened to a tow bar.

FIG. 2*a* illustrates a perspective view of the hitch locking module installed and closed.

FIG. 2*b* illustrates a perspective view of the hitch locking module installed and open.

FIG. 3 illustrates a perspective view of the hitch locking module in a closed and locked configuration.

FIGS. 4*a*, 4*b* and 4*c* illustrate the functioning of the hitch locking module.

FIGS. 5*a* and 5*b* illustrate perspective views of the functioning of the hitch locking module without the cover.

FIGS. 6*a* and 6*b* illustrate rear views of the functioning of the hitch locking module without the cover.

FIG. 7*a* illustrates a top view of the hitch locking module.

FIG. 7*b* illustrates a rear view of the hitch locking module.

FIG. 7*c* illustrates a bottom view of the hitch locking module.

FIG. 7*d* illustrates a side view of the hitch locking module.

FIG. 7*e* illustrates a front view of the hitch locking module.

DETAILED DESCRIPTION OF THE PREFERRED EMBODIMENT

Figure 1:
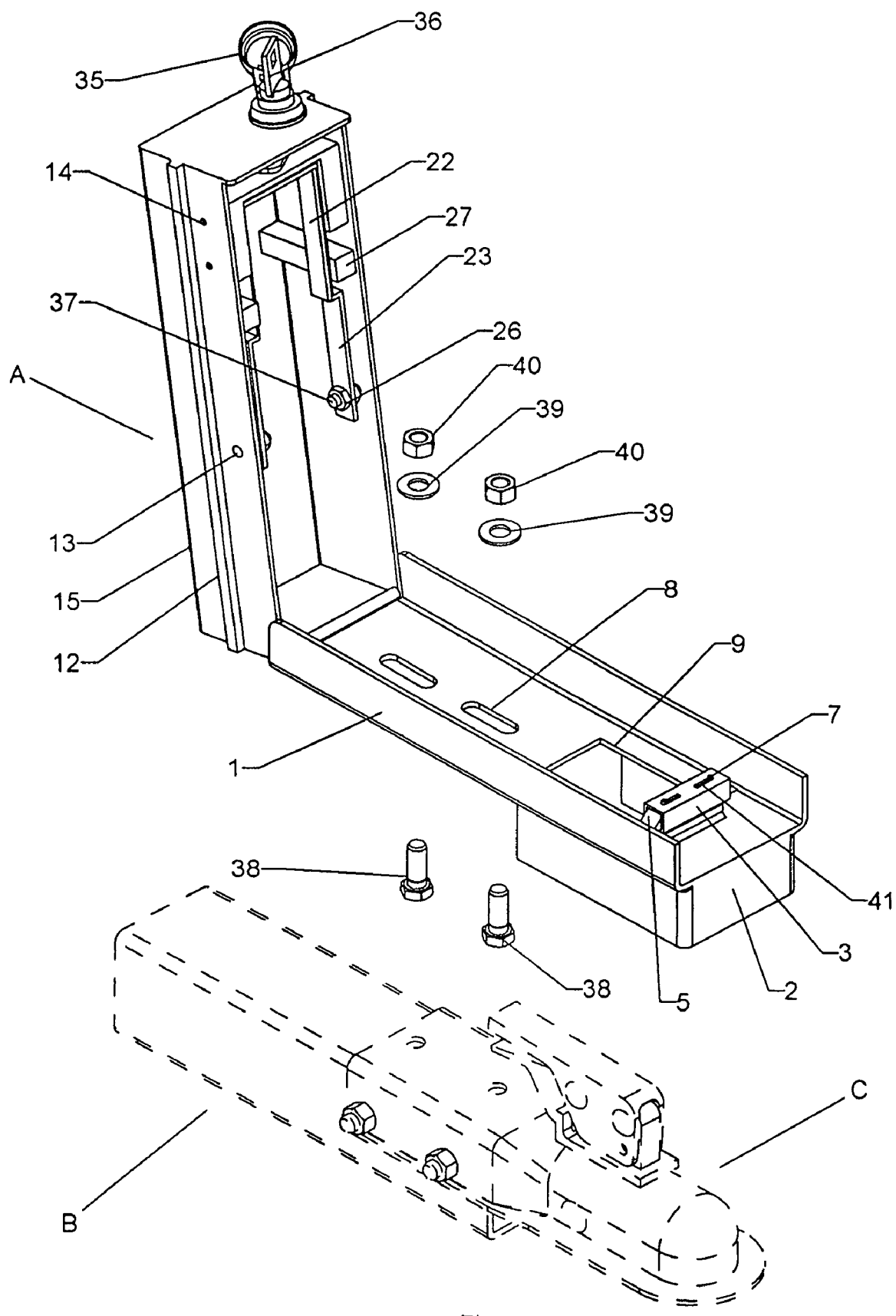
Figure 2:
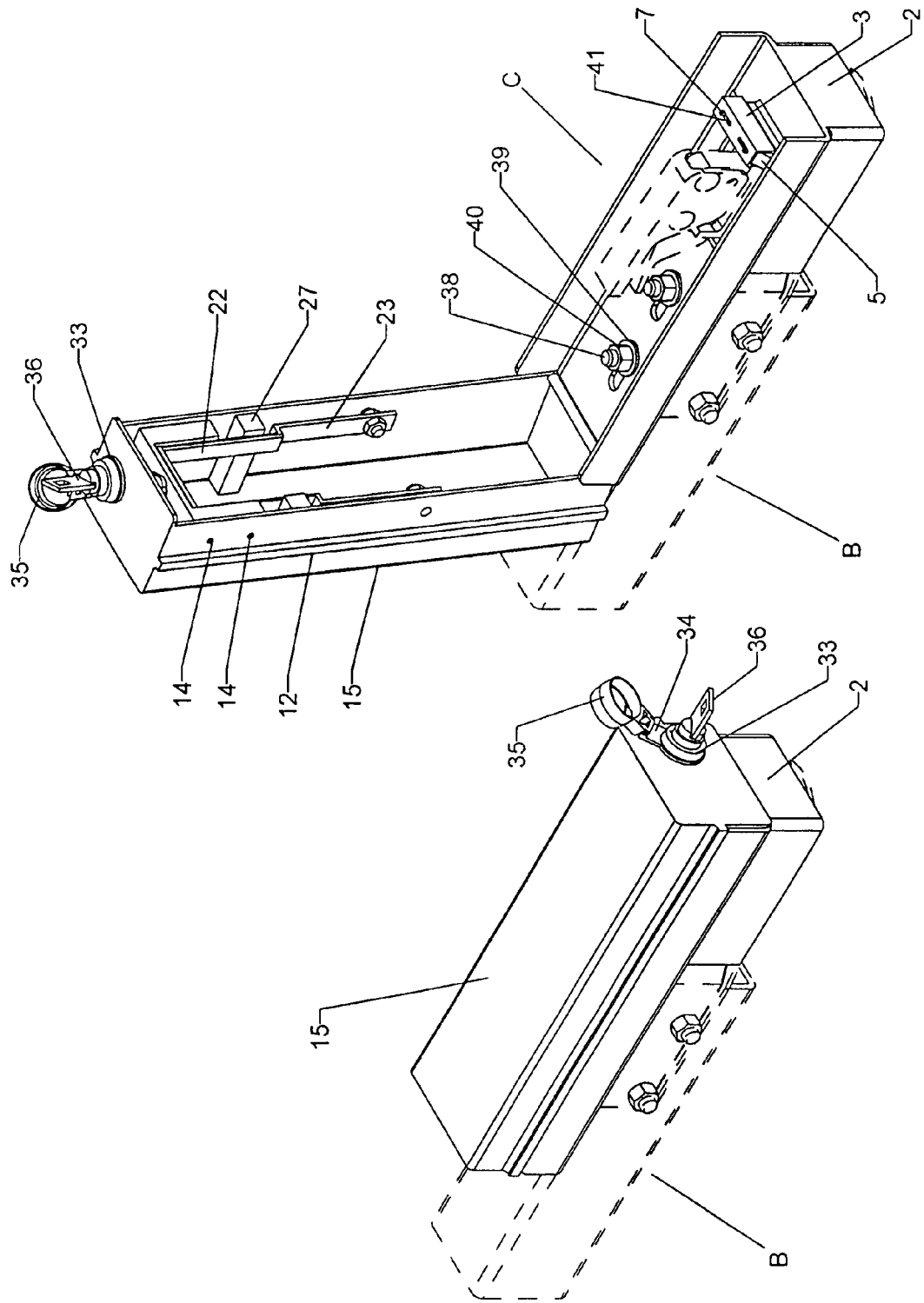
Figure 3:
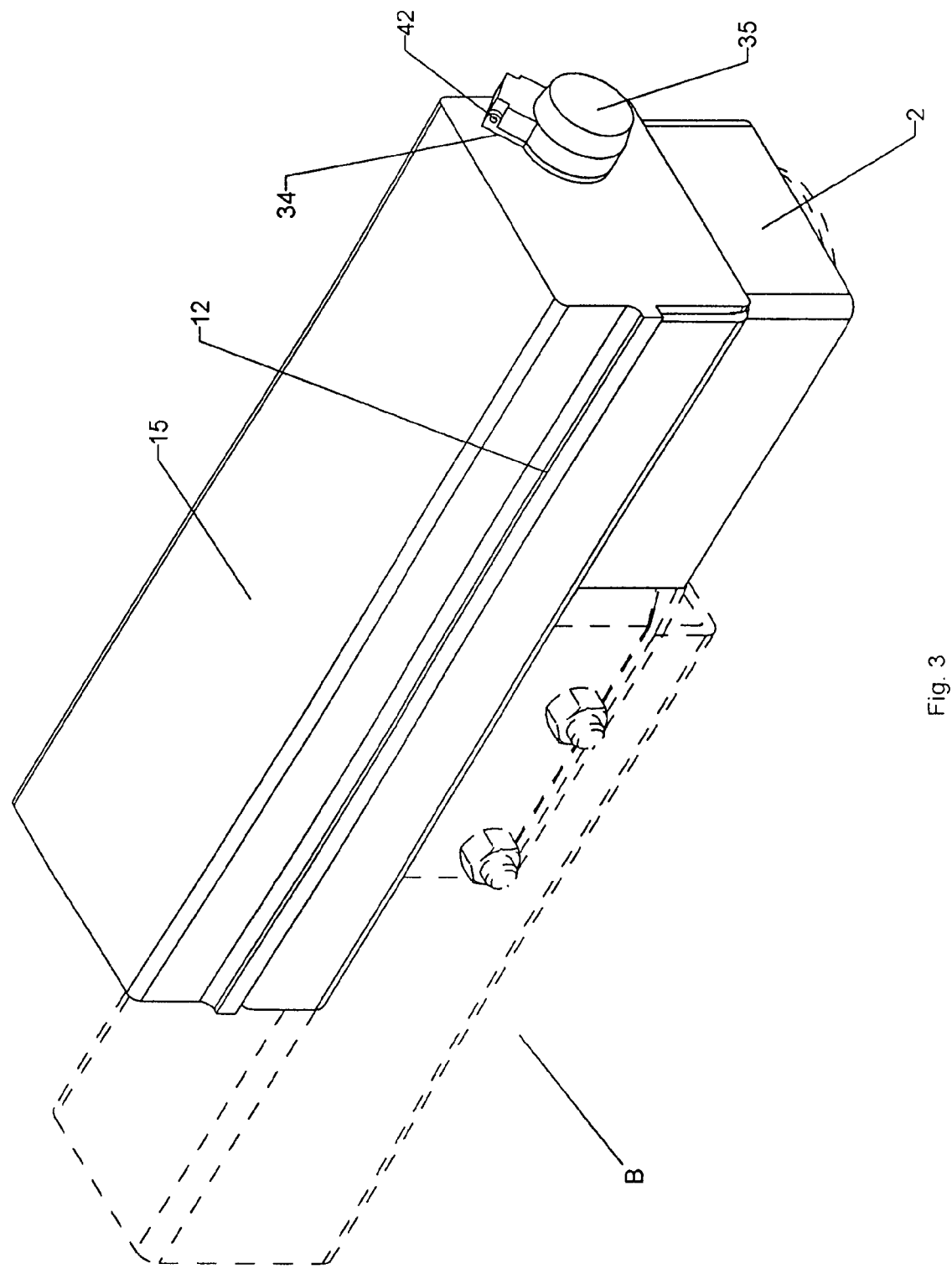
Figure 5A:
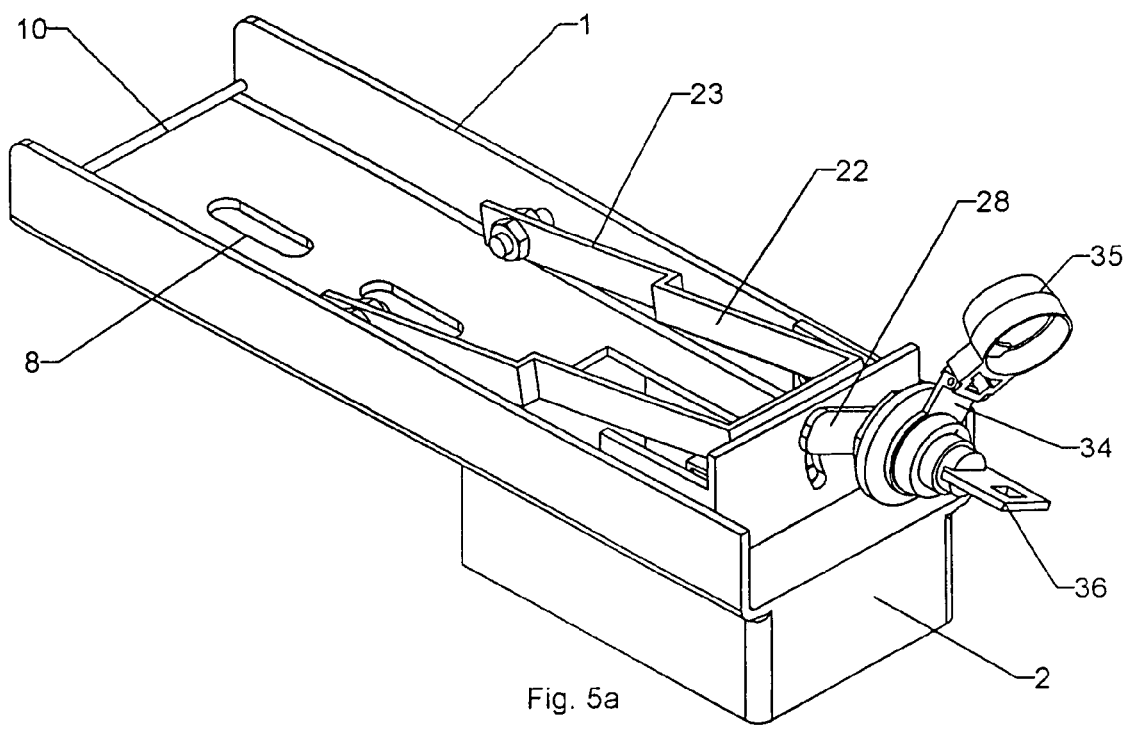
Figure 5B:
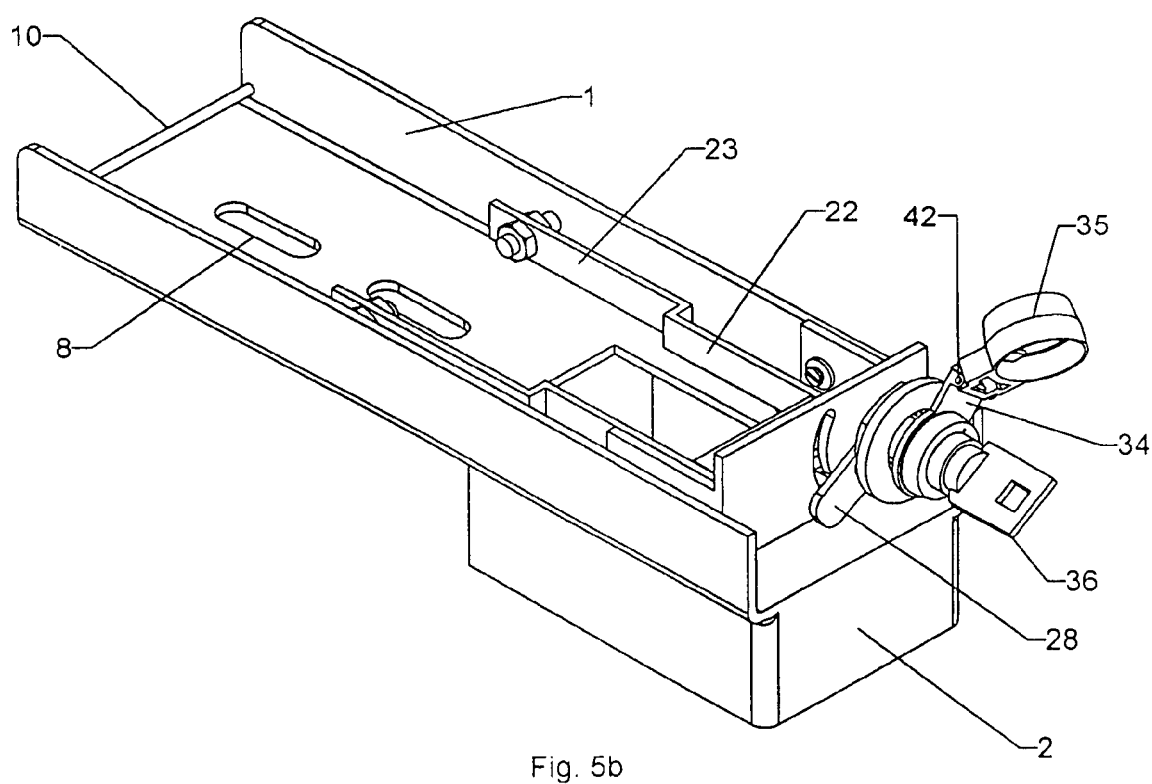

According to the preferred embodiment of the present invention, as depicted in FIGS. 1 to 9, a hitch locking module (A) has a base part (1), and a cover part (15). The cover part (15) is hingedly attached by a hinge (10) received therein holes (11) so that it opens up to give access to a hitch locking means (see FIG. 2*b*). A hitch ball receptacle (C) is mechanically fastened to a tow bar (B), as is well known in the art. In order to fasten the base module (1) to the hitch ball receptacle (C), mechanical fasteners (38)(39)(40) are used. They cannot be accessed from within the tow bar (B) and once the cover (15) is locked, they cannot be accessed from within the hitch locking module (A) which makes them tamper proof. A nut lock also protects the hitch locking means nut from being accessed when the hitch locking means is in the closed position (open position is shown). The nut lock works by making the sides of the hitch locking means nut unreachable by wrenches, sockets or any other such means as long as the hitch locking means is in the closed position.

Figure 8:
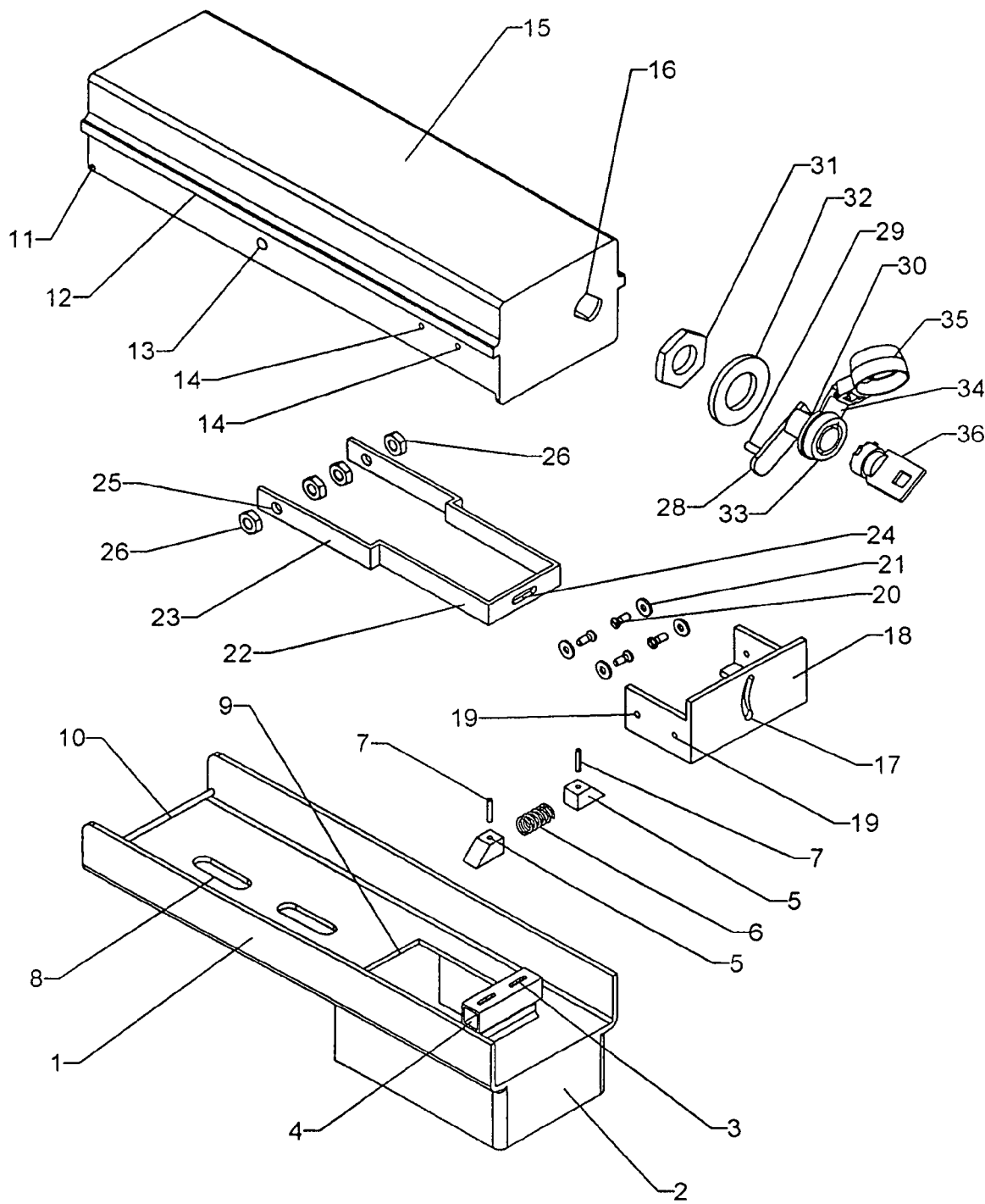
FIG. 8 illustrates an exploded view of the hitch locking module.
Figure 9:
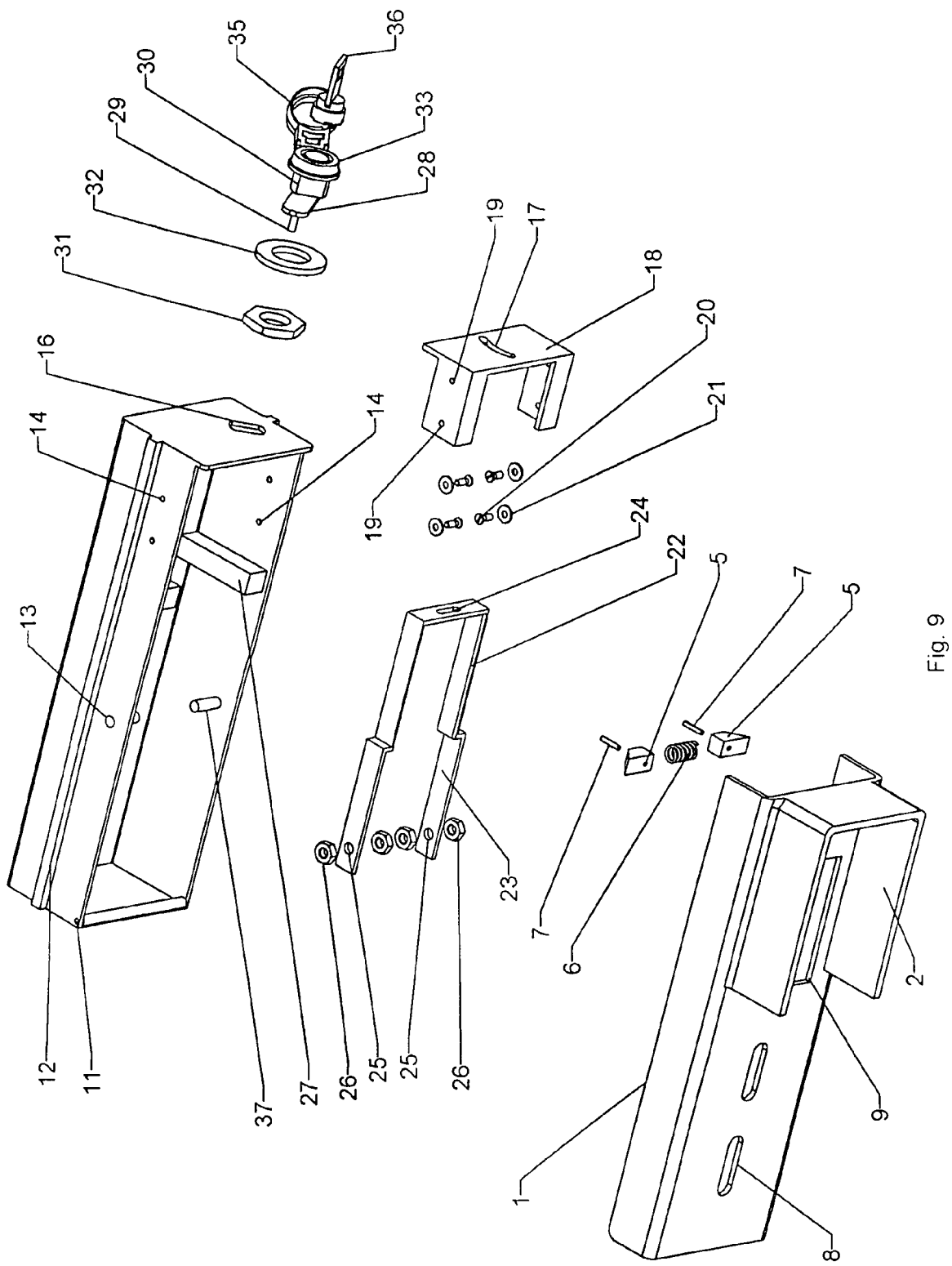
FIG. 9 illustrates an exploded bottom view of the hitch locking module.

According to the preferred embodiment of the present invention, as depicted in FIGS. 1, 8 and 9, the base part (1) has mechanical fasteners slots (8) through which pass the mechanical fasteners (38), a three sided protective cover (2) to shield the hitch ball receptacle (C) against tampering, and a hole (9) through which passes part of the hitch locking means.

In order for the hitch locking module (A) to lock, a bracket (18) engages a set of latches (5) which are received through a cavity (4) and which are arranged against a compression spring (6). The latches (5) have each a hole to engage a pin (7) therein and through slots (41) thereof the latch container (3). The bracket (18) which has holes (19) for connecting with holes (14) thereof the cover part (15) by bolts (20) and nuts (21).

In order to unlock, a guillotine guided by a pair of block members (27) presses down on the latches (5) so that they are pushed inside the latch container (3) and disengaged from the bracket (18). The guillotine has holes (25) at its lower part (23) for connecting with a pin (37) received through a hole (13) thereon each side of the cover part (15) and of which is fixed thereby nuts (26).

Pressing down of the guillotine is accomplished by turning a key (36) which turns a tongue (28) which engages a rod (29) extending perpendicularly through a slot (17) thereof the bracket (18) and a slot (24) thereof the upper part (22) from the guillotine, thus pushing the guillotine down on the latches (5).

In order to fasten a protective cover (35) to a part member (34), mechanical fasteners are used.

In order to couple the lock (33) to the tongue (28), a part member (30) is received through a hole (16) and connecting pieces (31)(32) are used. Side ridges (12) seal the inside of the locking module and prevent tampering.

Although only a single embodiment of the present invention has been described and illustrated, the present invention is not limited to the features of this embodiment, but includes all variations and modifications within the scope of claims.

We claim:

1. A hitch locking module comprising:

a base part, and a cover part;

said cover part being hingedly attached to said base part so as to open up to give access to a hitch locking means;

a hitch ball receptacle being mechanically fastened to a tow bar by mechanical fasteners;

a nut lock to protect said hitch locking means nut from being accessed when said hitch locking means is in the closed position;

said base part having mechanical fasteners slots through which pass said mechanical fasteners;

said base part further having a three sided protective cover to shield said hitch ball receptacle;

said base part further having a hole through which passes part of said hitch locking means;

said base part still further having a latch container to receive a compression spring which is arranged between a set of latches having each a hole to engage a pin therein and through slots thereof the latch container;

said cover part further having a bracket to engage the set of latches in order for said hitch locking module to lock, and wherein said bracket includes holes for connecting with holes thereof said cover part by bolts and nuts;

said covert part further having a guillotine to be guided by a set of block members, wherein the guillotine presses down on said latches so as to unlock said hitch locking module, and wherein said latches are pushed inside said latch container and disengaged from said bracket; and wherein said guillotine includes holes for connecting with a pin through a hole thereon each side of said covert part and of which is fixed thereby nuts;

said cover part further having a key to enter a lock for turning a tongue which engages a rod extending perpendicularly through a slot thereof said bracket and a slot thereof said guillotine so as to push said guillotine down on said latches; and said cover part still further having sides ridges to seal the inside of said locking module and prevent tampering.

* * * * *